United States Patent
Kranz et al.

(10) Patent No.: US 8,336,574 B2
(45) Date of Patent: Dec. 25, 2012

(54) PRESSURE AVERAGING SENSE TUBE FOR GAS REGULATOR

(75) Inventors: Seth Kranz, Royse City, TX (US); Joseph Losh, Van Alstyne, TX (US)

(73) Assignee: Fisher Controls International LLC, St. Louis, MO (US)

( * ) Notice: Subject to any disclaimer, the term of this patent is extended or adjusted under 35 U.S.C. 154(b) by 887 days.

(21) Appl. No.: 12/099,463

(22) Filed: Apr. 8, 2008

(65) Prior Publication Data

US 2008/0257418 A1 Oct. 23, 2008

Related U.S. Application Data

(60) Provisional application No. 60/913,127, filed on Apr. 20, 2007.

(51) Int. Cl.
*F16K 31/165* (2006.01)
*F16K 31/365* (2006.01)

(52) U.S. Cl. ............. 137/484.8; 137/484.4; 137/505.46; 137/505.47

(58) Field of Classification Search .............. 137/484.8, 137/484.2, 484.4, 484.6, 505.46, 505.47
See application file for complete search history.

(56) References Cited

U.S. PATENT DOCUMENTS

| | | | |
|---|---|---|---|
| 836,258 A | 11/1906 | Hubner et al. | |
| 1,166,027 A | 12/1915 | Weisgerber et al. | |
| 1,262,225 A * | 4/1918 | Meyer | 137/484.2 |
| 1,918,602 A * | 7/1933 | Joyce | 137/484.4 |
| 1,973,744 A | 9/1934 | Brown | |
| 2,173,707 A | 9/1939 | Brown | |
| 2,192,327 A | 3/1940 | Palmer | |
| 2,215,419 A | 9/1940 | Cheeseman | |
| 2,263,581 A | 11/1941 | Hughes | |
| 2,315,370 A | 3/1943 | Hughes | |
| 2,522,732 A | 9/1950 | Fairchild | |
| 2,619,983 A | 12/1952 | Roberts | |
| 2,688,980 A * | 9/1954 | Pool | 137/514 |
| 2,826,213 A | 3/1958 | Wright | |

(Continued)

FOREIGN PATENT DOCUMENTS

DE 37 14 065 A1 10/1987

(Continued)

OTHER PUBLICATIONS

Office Action for Chinese Patent Application No. 200880012623.3, dated Dec. 21, 2011.

(Continued)

*Primary Examiner* — Stephen M Hepperle
*Assistant Examiner* — Jonathan Waddy
(74) *Attorney, Agent, or Firm* — Marshall, Gerstein & Borun LLP; Michael P. Furmanek (57) ABSTRACT

A regulator comprises a regulator valve and an actuator. The actuator is coupled to the regulator valve and comprises a control element for controlling the flow of fluid through the regulator valve. The actuator is additionally equipped with a pressure averaging sense tube to sense the actual pressure at the outlet of the regulator valve. The actual pressure is then supplied to a sensing element such as a diaphragm of the actuator to adjust the position of the control element. The pressure averaging sense tube includes an open sensing end and an elongated slot. The elongated slot advantageously senses and averages the pressure across the length of the sense tube to maximize the accuracy of the pressure signal supplied to the sensing element.

27 Claims, 5 Drawing Sheets

U.S. PATENT DOCUMENTS

| | | | |
|---|---|---|---|
| 2,827,069 A | | 3/1958 | Peterson |
| 2,869,575 A | | 1/1959 | Hutchens |
| 2,895,501 A | | 7/1959 | Irwin |
| 2,951,494 A | | 9/1960 | Holmes |
| 3,001,545 A | | 9/1961 | Ziege |
| 3,160,169 A | | 12/1964 | Peterson |
| 3,228,417 A | * | 1/1966 | Schwerter ............... 137/461 |
| 3,386,465 A | | 6/1968 | Johnson |
| 3,392,749 A | | 7/1968 | Gneiding et al. |
| 3,420,257 A | * | 1/1969 | Lansky et al. ............ 137/116.5 |
| 3,425,442 A | | 2/1969 | Johnson et al. |
| 3,488,685 A | | 1/1970 | Hughes |
| 3,525,356 A | | 8/1970 | Johnson et al. |
| 3,572,372 A | | 3/1971 | Moore |
| 3,580,271 A | | 5/1971 | Farrer et al. |
| 3,599,658 A | | 8/1971 | Kruzan et al. |
| 3,613,725 A | | 10/1971 | Hughes |
| 3,621,867 A | * | 11/1971 | Johnson ............... 137/484.8 |
| 3,623,506 A | * | 11/1971 | Bonner et al. ............ 137/613 |
| 3,658,082 A | * | 4/1972 | DiTirro ............... 137/116.5 |
| 3,705,599 A | | 12/1972 | Sheward |
| 3,722,536 A | * | 3/1973 | Hill et al. ............... 137/505.46 |
| 3,754,570 A | | 8/1973 | Hughes |
| 3,809,108 A | | 5/1974 | Hughes |
| RE28,447 E | | 6/1975 | Bonner et al. |
| 3,892,255 A | | 7/1975 | Johnson |
| 3,971,410 A | | 7/1976 | St. Clair |
| 4,019,531 A | | 4/1977 | Johnson |
| 4,067,354 A | | 1/1978 | St. Clair |
| 4,067,355 A | | 1/1978 | St. Clair |
| 4,069,839 A | | 1/1978 | Hughes |
| 4,129,145 A | | 12/1978 | Wynn |
| 4,176,677 A | * | 12/1979 | Hughes ............... 137/488 |
| 4,195,656 A | | 4/1980 | Kanerva et al. |
| 4,485,843 A | | 12/1984 | Wolff |
| 4,505,292 A | | 3/1985 | Osterode |
| 4,679,592 A | | 7/1987 | Lamb |
| 4,754,778 A | | 7/1988 | Duffy et al. |
| 4,842,013 A | | 6/1989 | Rice et al. |
| 4,889,158 A | | 12/1989 | Rice et al. |
| 4,972,868 A | | 11/1990 | Davis et al. |
| 4,972,871 A | | 11/1990 | Rice et al. |
| 5,007,614 A | | 4/1991 | Lockwood, Jr. |
| 5,176,148 A | | 1/1993 | Wiest et al. |
| 5,697,398 A | | 12/1997 | Gidney et al. |
| 5,881,765 A | | 3/1999 | Turney et al. |
| 5,887,853 A | | 3/1999 | Holmes et al. |
| 6,167,905 B1 | | 1/2001 | Malloy et al. |
| 6,321,166 B1 | * | 11/2001 | Evans et al. ............... 702/50 |
| 6,422,260 B2 | | 7/2002 | Danowski et al. |
| 7,537,194 B2 | | 5/2009 | Nagai |
| 2004/0187930 A1 | | 9/2004 | Hawkins et al. |
| 2005/0106952 A1 | | 5/2005 | Maxwell et al. |
| 2006/0065307 A1 | | 3/2006 | Schmidt et al. |
| 2008/0031755 A1 | | 2/2008 | Pekar |
| 2008/0257427 A1 | | 10/2008 | Zhang et al. |

FOREIGN PATENT DOCUMENTS

| | | |
|---|---|---|
| DE | 295 06 395 U1 | 6/1995 |
| EP | 0 277 869 A1 | 8/1988 |
| GB | 0 966 346 A | 8/1964 |
| GB | 1 220 467 | 1/1971 |
| GB | 2 024 996 A | 1/1980 |
| JP | 06-004140 A | 1/1994 |
| WO | WO-02/093284 A1 | 11/2002 |

OTHER PUBLICATIONS

Office Action for Chinese Patent Application No. 200880011137.X, dated Dec. 27, 2011.
International Search Report and Written Opinion for International Application No. PCT/US2008/060862, dated Aug. 5, 2008.
European Examination Report for Application No. 08746310.5, dated Aug. 8, 2011.
Office Action for Australian Application No. 2008242699, dated Sep. 22, 2011.
Second Chinese Office Action for Application No. 200880011137.X, dated Sep. 1, 2011.
Actaris Metering Systems, "CL34 Series Commercial Regulator, Advanced Metering and Regulation Technology at Work," pp. 1-12 (2001).
Actaris Metering Systems, "CL38 Series Commercial & Industrial Regulator, Advanced Metering and Regulation Technology at Work," pp. 1-27 (2002).
Actaris Metering Systems, "Gas Regulation Overview," pp. 1-16 (2004).
Actaris Metering Systems, "Regulator Loading Ring Instructions," pp. 1-2 (1996).
Australian Office Action for Application No. 2008242690, dated Mar. 10, 2011.
Australian Office Action for Application No. 2008242692, dated Feb. 22, 2011.
Australian Office Action for Application No. 2008242775, dated Nov. 16, 2010.
Australian Office Action for Application No. 2008242777, dated Nov. 29, 2010.
Emerson Process Management, "Y600A Series Pressure Reducing Regulators," Instruction Manual Form 5458, pp. 1-8 (2008).
European Examination Report for Application No. 08746301.4, Jan. 20, 2011.
European Office Action for Application No. 08746287.5-2206, dated Mar. 15, 2010.
European Office Action for Application No. 08746291.7, dated Mar. 15, 2010.
European Office Action for Application No. 08746310.5, dated Mar. 16, 2010.
First Office Action for Chinese Application No. 200880011104.5, dated Apr. 20, 2011.
First Office Action for Chinese Application No. 200880011630.1, dated Feb. 24, 2011.
First Office Action for Chinese Application No. 200880012891.5, dated Apr. 15, 2011.
Fisher-Rosemount, "Type Y600A Series Pressure Reducing Regulators. More Versatile Than Ever Before," pp. 1-2 (1998).
International Preliminary Report on Patentability for Application No. PCT/US2008/060842, dated Oct. 20, 2009.
International Preliminary Report on Patentability for Application No. PCT/US2008/060846, dated Oct. 20, 2009.
International Preliminary Report on Patentability for Application No. PCT/US2008/060857, dated Oct. 20, 2009.
International Preliminary Report on Patentability for Application No. PCT/US2008/060860, dated Oct. 20, 2009.
International Preliminary Report on Patentability for Application No. PCT/US2008/060872, dated Oct. 20, 2009.
International Search Report for Application No. PCT/US2008/060857, dated Aug. 1, 2008.
International Search Report for Application No. PCT/US2008/060842, dated Jul. 29, 2008.
International Search Report for Application No. PCT/US2008/060846, dated Aug. 6, 2008.
International Search Report for Application No. PCT/US2008/060860, dated Aug. 5, 2008.
International Search Report for Application No. PCT/US2008/060872, dated Aug. 5, 2008.
Schlumberger Gas, "CL-38 Series Constant Loaded Regulators," Data Sheet, pp. 1-8 (1997).
Written Opinion for Application No. PCT/US2008/060842, dated Jul. 29, 2008.
Written Opinion for Application No. PCT/US2008/060846, dated Aug. 6, 2008.
Written Opinion for Application No. PCT/US2008/060857, dated Aug. 1, 2008.
Written Opinion for Application No. PCT/US2008/060860, dated Aug. 5, 2008.
Written Opinion for Application No. PCT/US2008/060872, dated Aug. 5, 2008.
Office Action for Gulf Cooperation Council Application No. GCC/P/2008/10631, dated Sep. 19, 2011.

Second Office Action for Chinese Application No. 200880012623.3, dated Nov. 9, 2011.
Russian Office Action for Application No. 2009139833/28(056527), dated Jan. 23, 2012.
Russian Second Office Action for Application No. 2009139833/28(056527), dated May 24, 2012.
Extended European Search Report for Application No. 12158736.4, dated May 2, 2012.
Extended European Search Report for Application No. 12160527.3, dated Apr. 30, 2012.
Extended European Search Report for Application No. 12160711.3, dated Apr. 26, 2012.
Russian Office Action for Application No. 2009140597/28(057707), dated Mar. 22, 2012.
European Examination Report for Application No. 08746296.6, dated May 26, 2011.
First Chinese Office Action for Application No. 200880009704.8, dated May 31, 2011.
First Chinese Office Action for Application No. 200880011778.5, dated Jun. 21, 2011.
Office Action for Gulf Corporation Council Application No. GCC/P/2008/10630, dated Jul. 2, 2011.
Office Action for Japanese Application No. 2010-504278, dated Aug. 14, 2012.
Office Action for Japanese Application No. 2010-504288, dated Jul. 31, 2012.
Office Action for Japanese Application No. 2010-504277, dated Jul. 24, 2012.

* cited by examiner

__PRESSURE AVERAGING SENSE TUBE FOR GAS REGULATOR__

CROSS-REFERENCE TO RELATED APPLICATIONS

The priority benefit of U.S. Provisional Patent Application No. 60/913,127, filed Apr. 20, 2007, is hereby claimed and the entire contents thereof are incorporated herein by reference.

FIELD OF THE INVENTION

The present invention relates to gas regulators, and more particularly, to gas regulators having closed-loop flow control.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

Figure 1:
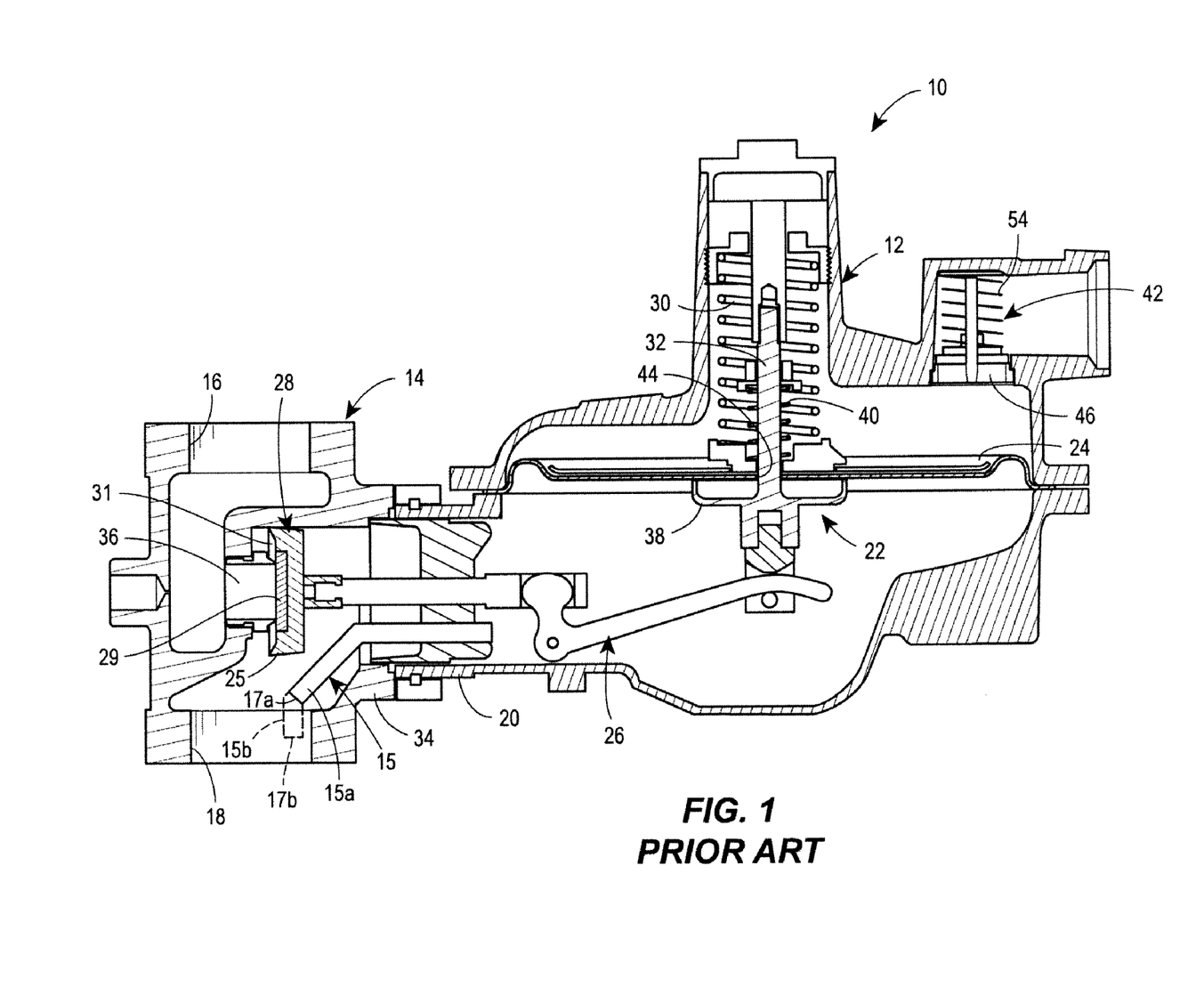
FIG. 1 is a side cross-sectional view of a conventional regulator.

FIG. 1 depicts one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 36 disposed between the inlet and the outlet. Gas must pass through the valve port 36 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for regulating the outlet pressure of the regulator valve 14 based on sensed outlet pressure. Specifically, the control assembly 22 includes a diaphragm supporting plate 19, a diaphragm 24, a piston 32, and a control arm 26 having a valve disc 28. The valve disc 28 includes a generally cylindrical body 25 and a sealing insert 29 fixed to the body 25. The diaphragm 24 senses the outlet pressure of the regulator valve 14 and provides a response to move the valve disc 28 to open and close the regulator valve 14. The control assembly 22 further includes a control spring 30 in engagement with a top-side of the control assembly 22 to offset the outlet pressure sensed by the diaphragm 24. Accordingly, the desired outlet pressure, which may also be referred to as the control pressure, is set by the selection of the control spring 30.

The diaphragm 24 is operably coupled to the control arm 26, and therefore, the valve disc 28, via the piston 32, and controls the opening of the regulator valve 14 based on the sensed outlet pressure. For example, when an end user operates an appliance, such as a furnace, for example, that places a demand on the gas distribution system downstream of the regulator 10, thereby decreasing the outlet pressure. Accordingly, the diaphragm 24 senses this decreased outlet pressure. This allows the control spring 30 to expand and move the piston 32 and the right-side of the control arm 26 downward, relative to the orientation of FIG. 1. This displacement of the control arm 26 moves the valve disc 28 away from the valve port 36 to open the regulator valve 14, thereby increasing the outlet flow to meet the increased demand from the appliance and increasing the outlet pressure back to the control pressure. So configured, the appliance may draw gas through the valve port 36 and through the outlet 18 of the regulator valve 14.

In the conventional regulator 10, the control spring 30 inherently generates less force as it expands towards an uncompressed length when displacing the control arm 26 to open the valve port 36. Additionally, as the control spring 30 expands, the diaphragm 24 deforms, which increases the area of the diaphragm 24. The decreased force supplied by the control spring 30 and the increased area of the diaphragm 24 in this operational scenario combine to create a regulator response wherein the force provided by the control spring 30 cannot adequately balance the force generated by the diaphragm 24 thereby resulting in an outlet control pressure that is less than that originally set by the user. This phenomenon is known as "droop." When "droop" occurs, the outlet pressure decreases below its set control pressure and the regulator 10 may not function as intended. "Droop" is one example of the detrimental effects of the dynamic pressures that may arise within a regulator 10.

To counteract such effects, some conventional regulators 10 include a pressure sense tube 15. The sense tube 15 may include a straight sense tube 15a, as illustrated in solid lines in FIG. 1, or may include a bent sense tube 15b, as illustrated in phantom. Either sense tube 15a, 15b includes an elongated cylindrical tube with an open, sensing end 17a, 17b. The open end 17a, 17b is configured to sense the pressure of the gas at the outlet 18 of the regulator valve 14, and the tubes 15a, 15b are adapted to transmit the sensed pressure to the diaphragm 24. Thus, the sense tubes 15a, 15b provide a more accurate detection of the pressure at the outlet 18 of the regulator valve 14, than the diaphragm 24 would otherwise sense. Operating without a sense tube 15a, 15b often leads to pressure higher than the downstream pressure being sensed by the diaphragm 24, due to dynamic pressure effects.

Figure 2:
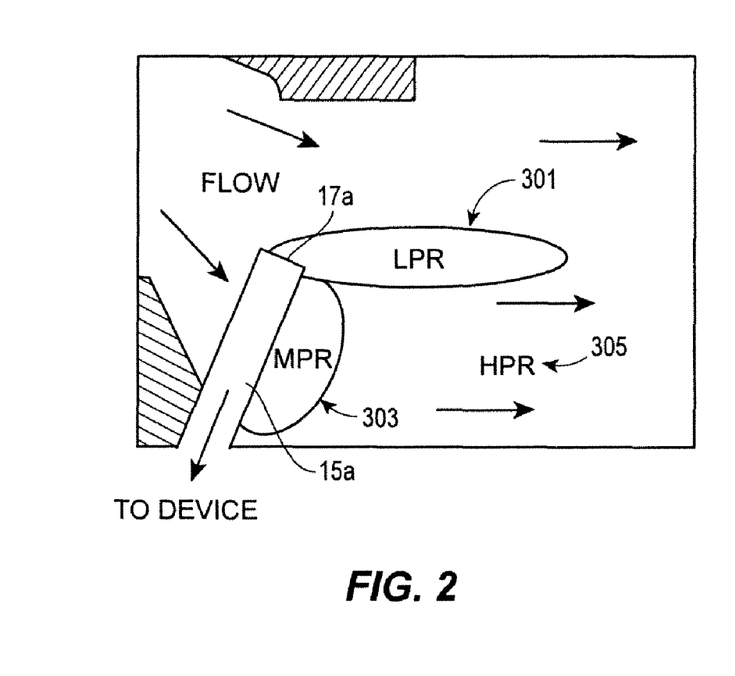
FIG. 2 is a schematic representation of the pressure regions developed around one sense tube configured for use with a regulator.
Figure 3:
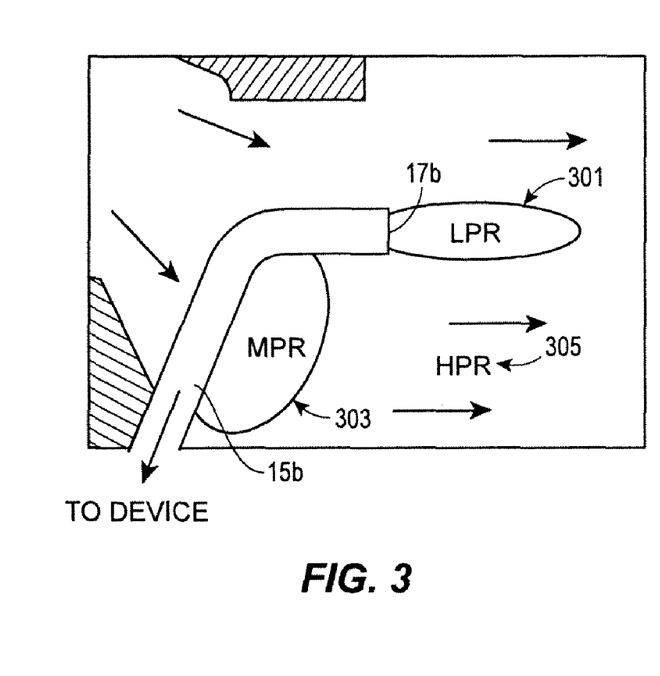
FIG. 3 is a schematic representation of the pressure regions developed around another sense tube configured for use with a regulator.

For example, with reference to FIGS. 2 and 3, as the flow of gas emerges from the valve port 36 and expands, it travels downstream and over the sense tube 15a, 15b. This creates three regions of pressure. The three regions include a Low Pressure Region (LPR) 301, a Medium Pressure Region (MPR) 303, and a High Pressure Region (HPR) 305.

The conventional sense tubes 15a, 15b depicted in FIGS. 2 and 3, as mentioned above, have open ends 17a, 17b. The open ends 17a, 17b only communicate pressure from the LPRs 301 to the diaphragm 24 of the actuator 12 depicted in FIG. 1. The pressure within the LPRs 301 decreases proportionately to the flow over the sense tubes 15a, 15b. As flow increases, the pressure within the LPRs 301 begins to deviate significantly from the true downstream pressure, thereby providing an increasingly inaccurate detection of pressure to the diaphragm 24 of the actuator 12. This can lead to the diaphragm 24 responding to a pressure that is lower than the actual outlet pressure, which may be undesirable.

Referring back to FIG. 1, the control assembly 22 of the conventional regulator 10 further functions as a relief valve. Specifically, the control assembly 22 also includes a relief spring 40 and a release valve 42. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation. Upon the occurrence of a failure such as a break in the control arm 26, the control assembly 22 is no longer in direct control of the valve disc 28 and inlet flow will move the valve disc 28 into an extreme open position. This allows a maximum amount of gas to flow into the actuator 12. Thus, as the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the release valve 42. The release valve 42 includes a valve plug 46 and a release spring 54 biasing the valve plug 46 into a closed position, as depicted in FIG. 1. Upon the pressure within the actuator 12 and adjacent the release valve 42 reaching a predetermined threshold pressure, the valve plug 46 displaces upward against the bias of the release spring 54 and opens, thereby exhausting gas into the atmosphere and reducing the pressure in the regulator 10. The sense tube 15 may also assist the regulator 10 in providing this relief function by providing a signal representative of the actual outlet pressure to the diaphragm 24 of the actuator 12. However, as mentioned above, the pressure sensed by the conventional sense tube 15 under high flow conditions, for example, may be inaccurate.

SUMMARY

The present invention provides a regulator comprising a regulator valve and an actuator. The actuator is coupled to the regulator valve and comprises a control element for controlling the flow of fluid through the regulator valve. The actuator is additionally equipped with a pressure averaging sense tube to advantageously sense the actual pressure at the outlet of the regulator valve. The averaged actual pressure is then supplied to the actuator to adjust the position of the control element.

In one embodiment, the pressure averaging sense tube includes an open sensing end and an elongated slot. The elongated slot may include a linear slot, a wavy slot, a slot having variable thickness, or generally any other geometrical configuration.

In other embodiments, the size, configuration, and other factors or characteristics of the slot and/or the sense tube may be customized for a particular application of the specific fluid control device.

DETAILED DESCRIPTION

Figure 4:
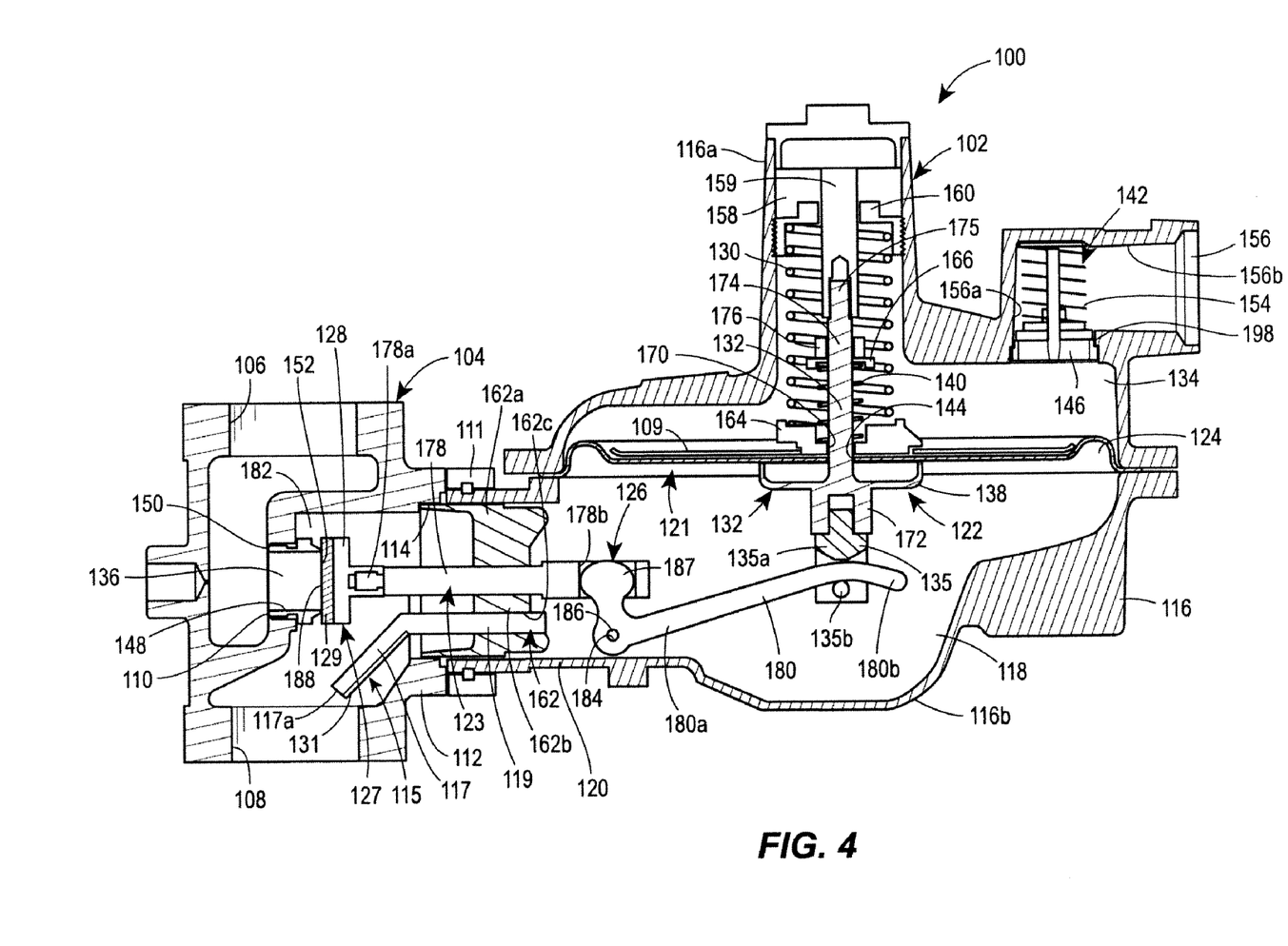
FIG. 4 is a side cross-sectional view of a regulator including a sense tube, the regulator and the sense tube being constructed in accordance with one embodiment of the present invention.

FIG. 4 depicts a gas regulator 100 including a sense tube 115, the regulator 100 and the sense tube 115 are constructed in accordance with one embodiment of the present invention. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127. During a first or normal operational mode, the control assembly 122 senses the pressure at the outlet 108 of the regulator valve 104, i.e., the outlet pressure, and controls a position of the control element 127 such that the outlet pressure approximately equals a predetermined control pressure. Additionally, upon the occurrence of a failure in the system, the regulator 100 performs a relief function that is generally similar to the relief function described above with reference to the regulator 10 depicted in FIG. 1.

The regulator valve 104 defines a throat 110 and a valve mouth 112. The throat 110 is disposed between the inlet 106 and the outlet 108. A valve port 136 is disposed in the throat 110 and defines a bore 148 having an inlet 150 and an outlet 152. Gas must travel through the bore 148 in the valve port 136 to travel between the inlet 106 and the outlet 108 of the regulator valve 104. The valve port 136 is removable from the regulator valve 104 such that it may be replaced with a different valve port having a bore of a different diameter or configuration to tailor operational and flow characteristics of the regulator valve 104 to a specific application. In the disclosed embodiment, the valve mouth 112 defines an opening 114 disposed along an axis that is generally perpendicular to an axis of the inlet 106 and outlet 108 of the regulator valve 104.

The actuator 102 includes a housing 116 and the control assembly 122, as mentioned above. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. In the disclosed embodiment, the regulator 100 includes a collar 111 securing the mouths 112, 120 together. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121, a disc subassembly 123, and a release valve 142. The diaphragm subassembly 121 includes a diaphragm support plate 109, a diaphragm 124, a piston 132, a control spring 130, a relief spring 140, a combination spring seat 164, a relief spring seat 166, a control spring seat 160, and a piston guide 159.

More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The combination spring seat 164 is disposed on top of the diaphragm 124 and defines an opening 170 disposed concentric with the opening 144 in the diaphragm 124. As depicted in FIG. 4, the combination spring seat 164 supports the control spring 130 and the relief spring 140.

The piston 132 of the disclosed embodiment includes a generally elongated rod-shaped member having a sealing cup portion 138, a yoke 172, a threaded portion 174, and a guide portion 175. The sealing cup portion 138 is concaved and generally disc-shaped and extends circumferentially about a mid-portion of the piston 132, and is located just below the diaphragm 124. The yoke 172 includes a cavity adapted to accommodate a coupler 135 which connects to a portion of the disc subassembly 123 to enable attachment between the diaphragm subassembly 121 and the disc subassembly 123, as will be described.

The guide portion 175 and the threaded portion 174 of the piston 132 are disposed through the openings 144, 170 in the diaphragm 124 and the combination spring seat 164, respectively. The guide portion 175 of the piston 132 is slidably disposed in a cavity in the piston guide 159, which maintains the axial alignment of the piston 132 relative to the remainder of the control assembly 122. The relief spring 140, the relief spring seat 166, and a nut 176, are disposed on the threaded portion 174 of the piston 132. The nut 176 retains the relief spring 140 between the combination spring seat 164 and the relief spring seat 166. The control spring 130 is disposed on top of the combination spring seat 164, as mentioned, and within the tower portion 158 of the upper housing component 116a. The control spring seat 160 is threaded into the tower portion 158 and compresses the control spring 130 against the combination spring seat 164. In the disclosed embodiment, the control spring 130 and the relief spring 140 include compression coil springs. Accordingly, the control spring 130 is grounded against the upper housing component 116a and applies a downward force to the combination spring seat 164 and the diaphragm 124. The relief spring 140 is grounded against the combination spring seat 164 and applies an upward force to the relief spring seat 166, which in turn is applied to the piston 132. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. Accordingly, the force applied by the control spring 130 sets the outlet pressure to a desired, or control pressure for the regulator 100. The diaphragm subassembly 121 is operably coupled to the disc subassembly 123, as mentioned above, via the yoke portion 172 of the piston 132 and the coupler 135.

Specifically, the disc subassembly 123 includes a control arm 126 and a stem guide 162. The control arm 126 includes a stem 178, a lever 180, and the control element 127. The control element 127 of the disclosed embodiment includes a valve disc 128. Additionally, in the disclosed embodiment, the valve disc 128 includes a sealing disc 129 for sealing against the valve port 136 as depicted in FIG. 4. The sealing disc 129 may be attached to the remainder of the valve disc 128 with adhesive, for example, or some other means. The sealing disc 129 may be constructed of the same material or a different material than remainder of the valve disc 128. For example, in one embodiment, the sealing disc 129 may include a polymer sealing disc 129.

The stem 178, the lever 180, and the valve disc 128 are constructed separately and assembled to form the control arm 126. Specifically, the stem 178 is a generally linear rod having a nose 178a and a recess 178b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 178b of the stem 178. The free end 180b is received between a top portion 135a and a pin 135b of the coupler 135 that is attached to the yoke 172 of the piston 132. Thus, the coupler 135 operably connects the disc subassembly 123 to the diaphragm subassembly 121.

The stem guide 162 includes a generally cylindrical outer portion 162a, a generally cylindrical inner portion 162b, and a plurality of radial webs 162c connecting the inner and outer portions 162b, 162a. The outer portion 162a of the stem guide 162 is sized and configured to fit within the mouths 112, 120 of the regulator valve 104 and lower housing component 116b, respectively. The inner portion 162b is sized and configured to slidably retain the stem 178 of the control arm 126. Thus, the stem guide 162 serves to maintain the alignment of the regulator valve 104, the actuator housing 116, and the control assembly 122, and more particularly, the stem 178 of the control arm 126 of the control assembly 122.

FIG. 4 depicts the control element 127 in a closed position where the valve disc 128 sealingly engages the outlet 152 of the valve port 136. So configured, gas does not flow through the valve port 136 and the regulator valve 104 is closed. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124 and the piston 132 into the closed position.

However, in the event that an operating demand is placed on the gas distribution system, e.g., a user begins operating an appliance such as a furnace, a stove, etc., the appliance draws gas flow from the control cavity 118 of the regulator 100, thereby reducing the pressure that is sensed by the diaphragm 124. As the pressure sensed by the diaphragm 124 decreases, a force imbalance occurs between a control spring force and an outlet pressure force on the diaphragm 124 such that the control spring 130 expands and displaces the diaphragm 124 and piston 132 downward, relative to the housing 116. This causes the lever 180 to pivot in the clockwise direction about the pivot pin 186, which, in turn, rotates the knuckle 187 relative to the recess 178b in the stem 178. This moves the stem 178 and the valve disc 128 away from the outlet 152 of the valve port 136 to open the regulator valve 104.

So configured, the gas distribution system is able to deliver gas to the downstream appliance through the regulator valve 104 at a control pressure that is set by the control spring 130. Additionally, the diaphragm subassembly 121 continues to sense the outlet pressure of the regulator valve 104. As long as the outlet pressure remains approximately equal to the control pressure, the control assembly 122 will keep the valve disc 128 in this same general position. However, if the outlet flow, i.e., the demand, decreases, thereby increasing the outlet pressure above the control pressure set by the control spring 130, the diaphragm 124 senses the increased outlet pressure and moves upward against the bias of the control spring 130. Alternatively, if the outlet flow, i.e., the demand, increases, thereby decreasing the outlet pressure below the control pressure, the diaphragm 124 senses the decreased outlet pressure and the spring 130 biases the diaphragm 124 and piston 132 downward to open the regulator valve 104. Thus, slight deviations from the outlet or control pressure causes the control assembly 122 to react and adjust the position of the valve disc 128.

As the control spring 130 expands to displace the valve disc 128 and open the valve port 136, the force it generates reduces and the area of the diaphragm 124 increases. As discussed above with reference to the conventional regulator 10 depicted in FIG. 1, this reduction in spring force and increased diaphragm area, can reduce the amount of outlet pressure required to balance the diaphragm 124. This, therefore causes the outlet pressure to decrease below the control pressure and as demand increases, the magnitude of the deviation also increases proportionately. As stated above, this phenomenon is known as "droop." One conventional solution to "droop" is to equip the regulator with one of the sense tubes 15a, 15b described above with reference to FIG. 1. However, as discussed, the conventional sense tubes 15a, 15b have shortcomings in that they do not, at all times, detect an accurate pressure due to the dynamics of the fluid flowing through the regulator valve, and particularly the presence of the changing pressures within the LPRs 301 adjacent the sensing ends 17a, 17b.

Accordingly, the regulator 100 depicted in FIG. 4 is equipped with a sense tube 115 that is capable of averaging the pressure sensed at the outlet 108 of the regulator valve 104. Such averaging enables the sense tube 115 to transmit a more accurate pressure signal to the control cavity 118 of the actuator 102, and more particularly, to the diaphragm 124. The sense tube 115 depicted in FIG. 4 is generally similar to the sense tube 15a depicted in FIG. 1, in that it includes a cylindrical tube having a sensing portion 117 and a mounting portion 119, the sensing portion 117 includes an open, sensing end 117a. The mounting portion 119 is disposed at an angle relative to the sensing portion 117. Additionally, however, the sensing portion 117 of the sense tube 115 of the embodiment depicted in FIG. 4 includes an elongated slot 131, which is depicted more clearly in FIG. 5. The slot 131 of the embodiment depicted in FIG. 5 includes a linear slot that extends from the sensing end 117a of the sensing portion 117 substantially to the mounting portion 119.

Figure 5:
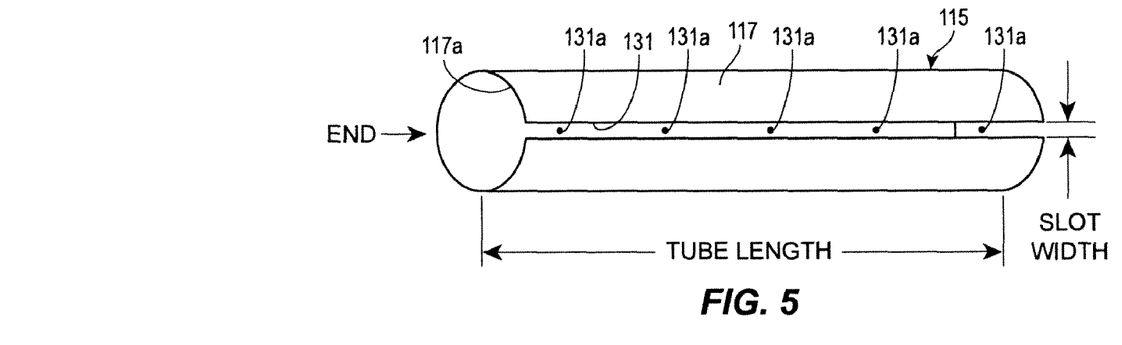
FIG. 5 is a perspective view of one embodiment of a sensing portion of a pressure averaging sense tube constructed in accordance with the principles of the present invention.
Figure 6A:
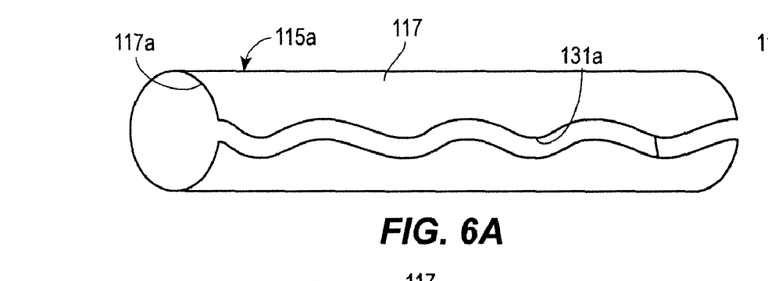
FIGS. 6A-6D are perspective views of various alternative embodiments of sensing portions of pressure averaging sense tubes constructed in accordance with the principles of the present invention.
Figure 6B:
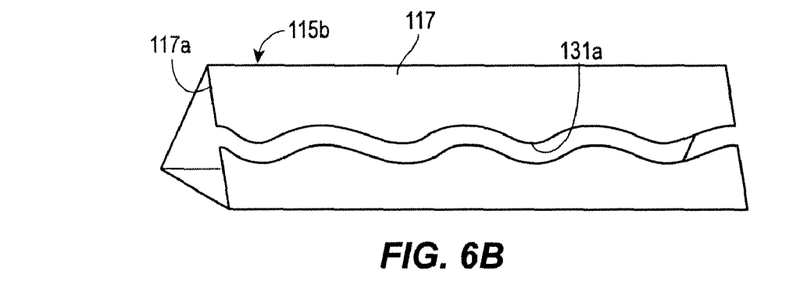
Figure 6C:
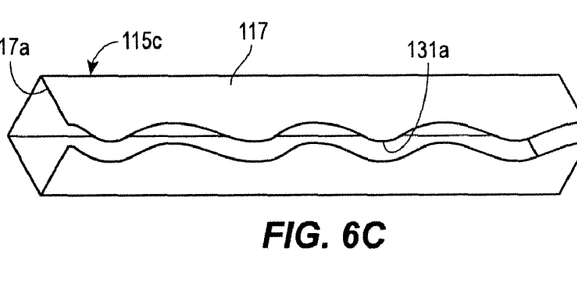
Figure 6D:
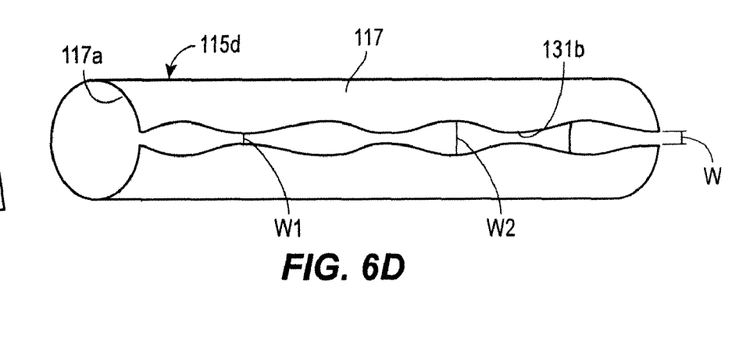

As depicted in FIG. 4, the mounting portion 119 of the disclosed embodiment is carried by the stem guide 162 of the disc subassembly 123 of the actuator 102. More specifically, the mounting portion 119 is mounted between a pair of the radial webs 162c of the stem guide 162. In one embodiment, the mounting portion 119 may be fixed between the radial webs 162c of the stem guide 162 with an interference, or friction fit, with an adhesive, with a splined connection, or generally any other means. So configured, the sensing portion 117 of the sense tube 115 is disposed proximate to the outlet 108 of the regulator valve 104. Thus, as depicted in FIG. 4, the slot 131 in the sensing portion 117 of the sense tube 115 faces away from the valve port 136, e.g., in a direction downstream of the valve port 136. In other words, the slot 131 is in communication with the Medium Pressure Region (MPR) 303 depicted in FIG. 2, for example. Additionally, the sensing end 117a is disposed in communication with the Low Pressure Region (LPR) 301 depicted in FIG. 2, for example. Therefore, not only can the pressure averaging sense tube 115 sense the pressure in the LPR 301 with the sensing end 117a, but it can also sample the pressure in the MPR 303 at a plurality of locations along the length of the slot 131. For example, and for the sake of description, the slot 131 defines the pressure averaging sense tube 115 as having a plurality of pressure sensing locations 131a along the length thereof, as depicted in FIG. 5, for example. While FIG. 5 only identifies five such pressure sensing locations 131a, one of ordinary skill in the art would appreciate that the number of pressure sensing locations 131a spaced along the slot 131 can effectively be infinite.

Thus, the pressure averaging sense tube 115 of the present embodiment of the present invention communicates pressure from both the LPR 301 and the MPR 303, depicted in FIG. 2, thereby providing an average of the pressure at the outlet 108 to the actuator 102. This averaging works to mitigate the decrease in pressure within the LPR 301 that occurs due to increased flow through the regulator valve 104. The pressure communicated to the actuator 102 by the pressure averaging sense tube 115 therefore more closely represents the true outlet pressure. A further advantage of the pressure averaging sense tube 115 of the present application is that as flow through the regulator valve 104 continues to increase, the accuracy of the pressure averaging sense tube 115 over the conventional sense tubes 15a, 15b becomes increasingly more pronounced.

While the pressure averaging sense tube 115 of the present invention has thus far been described as including a cylindrical sense tube 115 having a generally linear slot 131, as depicted in FIG. 5, for example, alternative embodiments may include alternative geometrical configurations. For example, FIGS. 6A-6D depict alternative pressure averaging sense tubes 115a-115d constructed in accordance with the principles of the present invention. Each of the sense tubes 115a-115c depicted in FIGS. 6A-6C include wavy slots 131a extending from the respective sensing ends 117a of the sensing portions 117. In contrast, the sense tube 115d depicted in FIG. 6D includes a slot 131b having a variable width dimension W. In the disclosed embodiment, the width W of the slot 131b depicted in FIG. 6 transitions between a minimum width W1 and a maximum width W2 such that if the width W were plotted versus the length of the sense tube 115d, the width W may resemble a sinusoidal curve, for example.

The present invention is not limited to cylindrical sense tubes. For example, the sense tube 115b depicted in FIG. 6B includes a generally triangular cross-section. Still further, the sense tube 115c depicted in FIG. 6C includes a generally rectangular, and at least in one embodiment a square, cross-section. The present invention may include a sense tube of generally any cross-section.

Accordingly, it should be appreciated that the present invention is not limited to the embodiments of the pressure averaging sense tubes 115 disclosed herein, but rather, many alternative geometries of sense tubes and slots may be capable of serving the principles of the present invention, and therefore, are intended to be within the scope of the present invention. In another alternative embodiment, the pressure averaging sense tube 115 may not include a slot at all, but rather, can include a plurality of discrete openings spaced along the length the sensing portion 117 of the sense tube 115 where the slot 131 would otherwise be located.

In fact, it is foreseeable that the specific geometry of the pressure averaging sense tube 115 constructed in accordance with the present invention, including the cross-sectional geometry and the geometry, as well as the width, of the slot 131 may be customized for any given regulator application. For example, it may be beneficial to design or select a pressure averaging sense tube 115 having a particular cross-section and slot geometry and/or size such as width or length to optimally function for any given set of regulator parameters such as flow capacity, outlet control pressure, regulator valve size, valve port size, etc.

Furthermore, while the pressure averaging sense tube 115 has been disclosed herein as including a slot 131 disposed only in the sensing portion 117, alternative embodiments may include the slot 131 extending through the mounting portion 119 as well. Additionally, while the pressure averaging sense tube 115 has thus far been disclosed as resembling the straight sense tube 15 depicted in FIG. 2, for example, the sense tube 115 of the present invention may also be constructed as a bent sense tube resembling that which is depicted in FIG. 3. So configured, a bent sense tube constructed in accordance with the principles of present invention may include a slot extending from the sensing end of the sense tube to and/or through the mounting portion. In an alternative embodiment, the bent pressure averaging sense tube may not include a slot in the bent portion directly proximate to the open sensing end, but rather only in the portion in communication with the Medium Pressure Region (MPR) 303 depicted in FIG. 3, for example.

Thus, in light of the foregoing, the present invention provides a pressure averaging sense tube 115 capable of more accurately sensing the pressure at the outlet 108 of the regulator valve 104. This both helps compensate for the detrimental effects of "droop" as well as provide for a more accurate response in the event of a failure occurring.

For example, as mentioned above, the regulator 100 constructed in accordance with the present invention also serves a relief function if and when some component of the control assembly 122 fails. Upon such an occurrence, the valve disc 128 moves into a fully open position to allow gas to flow into the control cavity 118 of the actuator 102. This allows the pressure registration at the diaphragm 124 to be substantially equal to the outlet pressure of the valve 104. However, with the incorporation of the pressure averaging sense tube 115 of the present invention, an accurate pressure signal may arrive at the diaphragm 124 sooner than it would otherwise. This pressure moves the piston 132 and sealing cup 138 into an extreme downward position such that the regulator 100 may provide pressure relief at the outlet 108 of the regulator valve 104 as predetermined by the configuration of the relief valve 142.

For example, once the pressure in the control cavity 118 rises above a relief pressure, which is set by the relief spring 140, the pressure will force the diaphragm 124 and combination spring seat 164 upward, thereby compressing the relief spring 140 against the relief spring seat 166. This, in turn, disengages the diaphragm 124 from the sealing cup 138 of the piston 132 and allows gas to flow through the openings 144, 170 and into the relief cavity 134 above the diaphragm 124. As the relief cavity 134 fills with gas, its pressure increases.

Upon the pressure in the relief cavity 134 rising above a predetermined release pressure, the release valve 142 opens and exhausts gas through the exhaust port 156 to the atmosphere in a manner similar to that which is described above with reference to the conventional regulator 10 depicted in FIG. 1. Specifically, the release valve 142 includes a valve plug 146 and a release spring 154, as depicted in FIG. 4. The release valve 142 is contained within the upper housing component 116a of the housing 116 adjacent to the exhaust port 156. More particularly, the exhaust port 156 includes an L-shaped cavity comprising a vertical portion 156a and a horizontal portion 156b. The vertical portion 156a is in fluid communication with the relief cavity 134. The horizontal portion 156b is open to the atmosphere. The vertical portion 156a contains the release valve 142 and defines a seating surface 198. The release spring 154 therefore biases the valve plug 146 into a closed position against the seating surface 198 of the exhaust port 156.

Thus, in light of the foregoing, it should be appreciated that the present invention provides an advantageous means of providing a more accurate and timely pressure signal to the actuator. This advantageously offsets and/or prevents the effects of "droop," as well as increase the efficiency at which regulators operate. However, the regulator 100 described herein is merely one example of a fluid control device incorporating the principles of the present invention. Other fluid control devices including other regulators and control valves may also benefit from the structures and/or advantages of the present invention.

Figure 7:
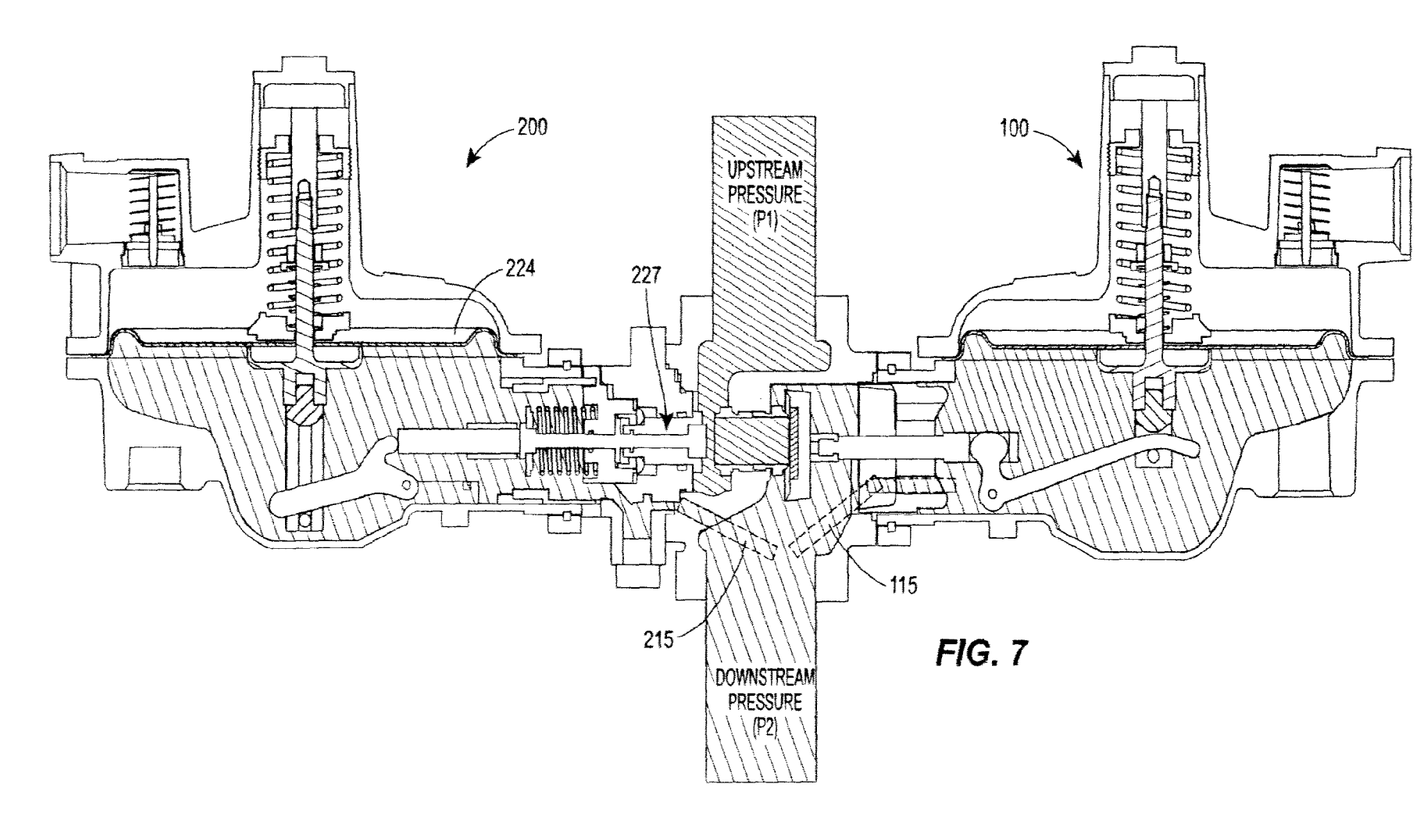
FIG. 7 is a cross-sectional side view of another alternative embodiment of the present invention including a regulator and a monitor, wherein each of which are equipped with a pressure averaging sense tube constructed in accordance with the principles of the present invention.

For example, FIG. 7 depicts a portion of a fluid distribution system including the regulator 100 described above, for example, and a monitor 200. The monitor 200 is adapted to provide a back-up to close the regulator valve 104 in the event the regulator 100 cannot function properly to close the regulator valve 104 in certain circumstances. Similar to the diaphragm 124 of the regulator 100, the monitor 200 includes a diaphragm 224 for sensing the outlet pressure of the regulator valve 104. Based on the sensed outlet pressure, the monitor 200 controls the position of a control element 227. Generally, the monitor 200 is configured to close the control element 227 and therefore stop the flow of fluid through the regulator valve 104 in accordance with an outlet pressure that is greater than the outlet pressure which would signal the regulator 100 to close the regulator valve 104.

Nevertheless, in the embodiment depicted in FIG. 7, the regulator 100 is equipped with a pressure averaging sense tube 115 and the monitor 200 is equipped with a pressure averaging sense tube 215. So configured, the sense tubes 115, 215 detect an average pressure at the outlet 108 of the regulator valve 104 in a manner identical to that described above with reference to the sense tubes 115. The sense tubes 115, 215 may include any of the sense tubes 115 described above, or may include any alternative sense tube constructed in accordance with the principles of the present invention.

What is claimed is:

1. A fluid regulating device, comprising:
   a valve comprising an inlet, an outlet, and a valve port disposed between the inlet and the outlet for allowing fluid to flow through the valve;
   an actuator coupled to the valve and comprising a control assembly, the control assembly comprising a control element and a diaphragm operably connected to the control element, the control element extending into the valve and adapted to be displaced relative to the valve port for controlling the flow of a fluid between the inlet and the outlet;
   a sense tube comprising a sensing portion and a mounting portion, the sensing portion comprising a tubular wall extending along a central longitudinal axis and an open end defined by the tubular wall and disposed proximate to the outlet of the valve and the mounting portion disposed proximate to the diaphragm of the actuator, the open end of the sensing portion comprising a complete cross-section through the tubular wall and disposed in a first plane that intersects the central longitudinal axis; and
   an elongated slot defined by the tubular wall of the sensing portion of the sense tube and extending from the open end to the mounting portion, the elongated slot disposed in a second plane that intersects the first plane such that the sensing portion is adapted to average the pressure at the outlet of the valve such that the sense tube communicates the averaged pressure to the diaphragm.

2. The device of claim 1, wherein the slot in the sensing portion of the sense tube is disposed away from the valve port of the valve.

3. The device of claim 1, wherein the slot in the sensing portion of the sense tube comprises at least one of a linear slot, a wavy slot, and a slot having a varying width.

4. The device of claim 1, wherein the sensing portion of the sense tube comprises one of a circular cross-section, a rectangular cross-section, and a triangular cross-section.

5. The device of claim 1, wherein the sensing portion of the sense tube comprises one of a straight sense tube and a bent sense tube.

6. The device of claim 1, further comprising a monitor coupled to the valve opposite the actuator, the monitor comprising:
- a second control element extending into the valve and adapted to be displaced relative to the valve port;
- a second diaphragm operably connected to the second control element; and
- a second sense tube comprising a second sensing portion and a second mounting portion, the second sensing portion disposed proximate to the outlet of the valve and the second mounting portion disposed proximate to the second diaphragm, the second sensing portion comprising a second open end and a second elongated slot extending from the second open end toward the second mounting portion such that the second sense tube is adapted to average the pressure at the outlet of the valve and communicate the averaged pressure to the second diaphragm.

7. The fluid regulating device of claim 1, wherein the open end is circular and the elongated slot is a linear slot that is not part of the open end.

8. The fluid regulating device of claim 1, wherein the first plane intersects the central longitudinal axis at approximately 90°.

9. The fluid regulating device of claim 1, wherein the second plane intersects the first plane at approximately 90°.

10. A fluid regulating device, comprising:
- a valve comprising an inlet, an outlet, and a valve port disposed between the inlet and the outlet for allowing fluid to flow through the valve;
- an actuator coupled to the valve and comprising a control assembly for controlling the flow of a fluid between the inlet and the outlet, the control assembly comprising a control element and a diaphragm operably connected to the control element, the control element extending into the valve and adapted to be displaced relative to the valve port; and
- a sense tube comprising a sensing portion and a mounting portion, the sensing portion comprising a tubular wall extending along a central longitudinal axis and a sensing end that is an open end defined by the tubular wall of the sense tube disposed proximate to the outlet of the valve and the mounting portion disposed proximate to the diaphragm, the open end of the sensing portion comprising a complete cross-section through the tubular wall and disposed in a first plane that intersects the central longitudinal axis; and
- a plurality of sensing locations spaced along the length of and defined the tubular wall of the sensing portion from the open end to the mounting portion, the plurality of sensing locations disposed in a second plane that intersects the first plane, wherein the open end and the plurality of sensing locations are adapted to cooperatively average the pressure at the outlet of the valve such that the sense tube communicates the averaged pressure to the diaphragm.

11. The device of claim 10, wherein the sensing portion of the sense tube comprises an elongated slot extending from the open end to the mounting portion, the slot defining the plurality of sensing locations.

12. The device of claim 11, wherein the slot in the sensing portion of the sense tube is disposed away from the valve port of the valve.

13. The device of claim 11, wherein the slot in the sensing portion of the sense tube comprises at least one of a linear slot, a wavy slot, and a slot having a varying width.

14. The device of claim 11, wherein the sense tube comprises one of a circular cross-section, a rectangular cross-section, and a triangular cross-section.

15. The device of claim 11, wherein the sensing portion of the sense tube comprises one of a straight sense tube and a bent sense tube.

16. The device of claim 11, further comprising a monitor coupled to the valve opposite the actuator, the monitor comprising:
- a second control element extending into the valve and adapted to be displaced relative to the valve port;
- a second diaphragm operably connected to the second control element; and
- a second sense tube comprising a second sensing portion and a second mounting portion, the second sensing portion disposed proximate to the outlet of the valve and the second mounting portion disposed proximate to the second diaphragm, the second sensing portion comprising a second open end and a second elongated slot extending from the second open end toward the second mounting portion such that the second sensing portion is adapted to average the pressure at the outlet of the valve and the second sense tube communicates the averaged pressure to the second diaphragm.

17. The fluid regulating device of claim 11, wherein the open end is circular and the elongated slot is a linear slot that is not part of the open end.

18. The fluid regulating device of claim 7, wherein the first plane intersects the central longitudinal axis at approximately 90°.

19. The fluid regulating device of claim 10, wherein the second plane intersects the first plane at approximately 90°.

20. A pressure averaging sense tube for use with a fluid regulating device, the fluid regulating device including an inlet, an outlet, a valve port disposed between the inlet and the outlet, and a control assembly adapted to be displaced relative to the valve port in response to a signal generated by the pressure averaging sense tube, thereby controlling the flow of a fluid between the inlet and the outlet, the pressure averaging sense tube comprising:
- a sensing portion comprising a tubular wall extending along a central longitudinal axis and an open end defined by the tubular wall and adapted to be disposed proximate to the outlet of the fluid regulating device, the open end of the sensing portion comprising a complete cross-section through the tubular wall and disposed in a first plane that intersects the central longitudinal axis;
- a mounting portion disposed at an angle relative to the sensing portion and adapted to be disposed proximate to the control assembly of the fluid regulating device; and
- an elongated slot formed in the tubular wall of the sensing portion and extending from the open end to the mounting portion, the elongated slot disposed in a second plane that intersects the first plane such that when the pressure averaging sense tube is installed within the fluid regulating device, the sensing portion is adapted to average the pressure at the outlet such that the pressure averaging sense tube communicates the averaged pressure to the control assembly.

21. The pressure averaging sense tube claim 20, wherein the slot in the sensing portion is adapted to be disposed away from the valve port of the fluid regulating device.

22. The pressure averaging sense tube of claim 20, wherein the slot comprises at least one of a linear slot, a wavy slot, and a slot having a varying width.

23. The pressure averaging sense tube of claim 20, wherein the sensing portion comprises one of a circular cross-section, a rectangular cross-section, and a triangular cross-section.

24. The pressure averaging sense tube of claim 20, wherein the sensing portion comprises one of a straight sense tube and a bent sense tube.

25. The pressure averaging sense tube of claim 20, wherein the open end is circular and the elongated slot is a linear slot that is not part of the open end.

26. The pressure averaging sense tube of claim 20, wherein the first plane intersects the central longitudinal axis at approximately 90°.

27. The pressure averaging sense tube of claim 20, wherein the second plane intersects the first plane at approximately 90°.

* * * * *

UNITED STATES PATENT AND TRADEMARK OFFICE
CERTIFICATE OF CORRECTION

PATENT NO.        : 8,336,574 B2
APPLICATION NO.   : 12/099463
DATED             : December 25, 2012
INVENTOR(S)       : Seth Kranz et al.

Page 1 of 1

It is certified that error appears in the above-identified patent and that said Letters Patent is hereby corrected as shown below:

In the Specification:

At Column 7, line 11, "causes" should be -- cause --.

At Column 8, line 8, "131 a" should be -- 131$a$ --.

At Column 10, line 11, "increase" should be -- increases --.

In the Claims:

At Column 11, line 65, "defined the" should be -- defined by the --.

Signed and Sealed this
Third Day of February, 2015

Michelle K. Lee
*Deputy Director of the United States Patent and Trademark Office*